Jan. 23, 1940. O. F. MARVIN 2,187,749
MANUFACTURE OF LEAD COMPOUNDS
Filed June 25, 1935
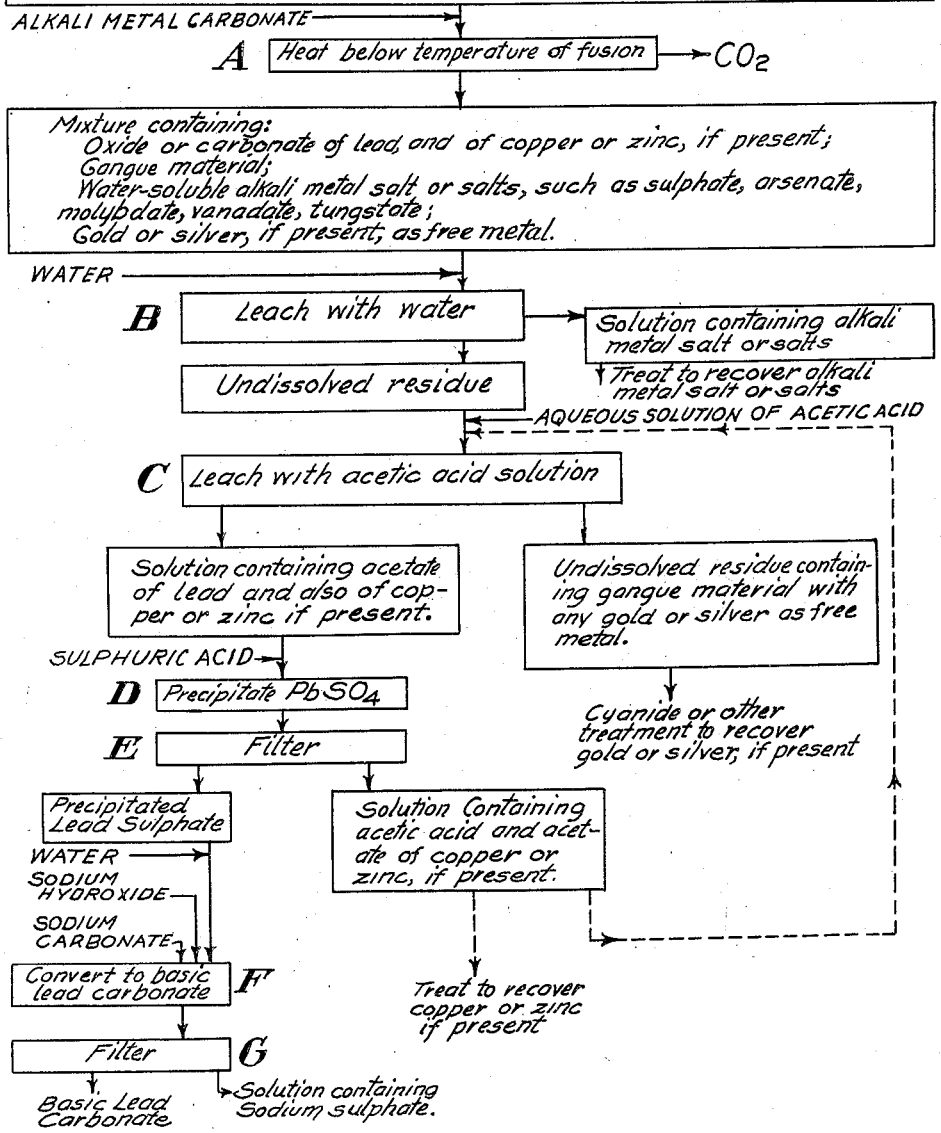
INVENTOR.
ORRIN F. MARVIN Patented Jan. 23, 1940

2,187,749

UNITED STATES PATENT OFFICE 2,187,749

MANUFACTURE OF LEAD COMPOUNDS

Orrin F. Marvin, Glendale, Calif., assignor to Marvin Metals, Inc., Los Angeles, Calif., a corporation of California Application June 25, 1935, Serial No. 28,384

2 Claims. (Cl. 23—69)

This invention relates to the production of lead compounds, and particularly to the production of finely divided lead compounds which may be used as pigments or for other purposes where a finely divided product is desired.

The principal object of the invention is to provide a novel, expeditious, and advantageous process for producing amorphous or finely divided lead compounds from ores or other materials containing lead compounds such as lead sulphide, lead sulphate, lead arsenide, lead arsenate, lead molybdate, lead vanadate, lead tungstate, lead silicate, or other compound of lead with an acidic radical, or a mixture of two or more such compounds, either alone or in the presence of other metals or compounds. The term "ore" as used herein will be understood to include not only naturally occurring ores, but also other materials containing one or more compounds of lead with an acidic radical, such as lead-bearing metallurgical slags.

A further object of the invention is to provide a method for the production of lead compounds, in which the desired compound, or a compound which may be readily converted into the desired compound, is caused to be precipitated in amorphous or extremely finely divided state, so that the compound thus precipitated is suitable for use as a pigment or for other purposes without further grinding or comminution, or may be readily converted into another lead compound which is also obtained in amorphous or extremely finely divided condition, and which is suitable for use as a pigment or for other purposes without further grinding or comminution.

A further object of the invention is to provide a process in which an ore or other material containing a lead compound is first treated to convert the lead to such form that it may be recovered from the ore by dissolution, to provide a solution from which a finely divided lead compound may be precipitated by simple treament.

A further object of my invention is to provide a commercially economical method of producing a finely divided lead compound, suitable as a pigment or as an insecticide, wherein the particles are characterized by the uniformity of their size and shape.

The principal methods now in use for the manufacture of basic lead carbonate or "white lead" are practically the same as those which have been used for hundreds of years, and consist in general of modifications or refinements of the so-called "corrosion" or "Old Dutch" process, in which metallic lead in the form of "buckles" or perforated plates is subjected to the corrosive action of acetic acid and carbon dioxide under moderate heat, usually produced by fermentation of some organic substance which also supplies the carbon dioxide for the reaction. This process is quite slow and costly, the conversion of the metallic lead to the finished white lead product ordinarily requiring a period of about three to four months. Also, the conversion of the metallic lead to the desired basic carbonate, by the above processes, is incomplete, and further treatment is required to remove the remaining lead, and moreover, it is difficult to produce a product of uniform composition. Furthermore, the above processes require metallic lead as a starting material, and the recovery of metallic lead from its ores by the ordinary smelting or reducing processes requires a considerable investment in plant and apparatus and ordinarily requires several days' time.

A particular object of the present invention is to provide a method in which white lead or basic lead carbonate, or other finely divided lead compound, of uniform and definitely controlled composition, may be produced directly from lead ores or the like, without requiring the production of metallic lead or the use of metallic lead as a starting material, and in which the entire process, from the lead ore to the white lead or other desired lead compound, may be carried out in a very short time, ordinarily not exceeding a few hours, with a relatively small investment in apparatus and a low cost of operation.

With these and other objects in view, the invention consists in the method hereinafter described.

The formation of a finely divided lead compound is effected, according to my process, by precipitation of such compound from an aqueous solution containing a soluble lead salt of an organic acid, and the invention therefore provides for treatment of the lead ore or the like in such manner as to convert the lead to the form of lead oxide or other lead compound which is preferably difficultly soluble in water, but is readily soluble in an aqueous solution of an organic acid capable of forming a water-soluble lead salt, after which the lead compound so formed is dissolved in an aqueous solution containing such an organic acid, to provide a solution containing a salt of lead with said organic acid, from which the desired finely divided lead compound may be precipitated. The treatment of the ore or the like is preferably such as to also convert the acidic radical or radicals originally present in combination with the lead, into a water-soluble compound or compounds, and the water-soluble compound or compounds thus formed are preferably removed, in aqueous solution, prior to the dissolving of the lead compound formed by said treatment.

I have found that lead ores, such as galena or other lead sulphide ores, or lead arsenide ores, or other lead ores such as above mentioned, may be caused to react with an alkaline compound, preferably a carbonate or oxide compound of an alkali metal, such as sodium or potassium carbonate or bicarbonate, or sodium or potassium oxide, at a suitable elevated temperature, for example between 400° and 880° C., preferably but not necessarily in the presence of air, to produce a water-soluble sodium or potassium compound and a lead compound, such as lead oxide or lead carbonate, which is difficultly soluble in water but is readily soluble in acetic acid or other organic acid capable of forming a water-soluble lead salt. As an example, the probable reaction which takes place on heating a lead sulphide ore with sodium carbonate in an oxidizing atmosphere may be written as follows:

(1) 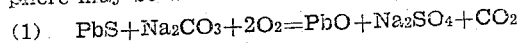
$$PbS + Na_2CO_3 + 2O_2 = PbO + Na_2SO_4 + CO_2$$

In the absence of oxygen, or with only a small amount of oxygen, i. e., in a substantially non-oxidizing atmosphere, the probable reaction may be partly or wholly as follows:

(2) 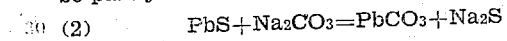
$$PbS + Na_2CO_3 = PbCO_3 + Na_2S$$

The exact manner in which this reaction takes place is immaterial for the purpose of this invention, but it appears that in the presence of oxygen it may consist at least in part of an oxidation of the lead sulphide to the sulphate, which then reacts with sodium carbonate to produce lead oxide, possibly with the intermediate production of lead carbonate which then decomposes to the oxide. The sodium compound formed may be sodium sulphate, sodium sulphite, or sodium sulphide, or mixtures of any two or all of these compounds. Substantially the same type of reaction also takes place with other lead ores such as lead arsenide, or any of the other examples above mentioned, resulting in the production of lead oxide or lead carbonate and a water-soluble sodium compound such as sodium arsenide, arsenite, or arsenate, or other alkali metal compound, depending upon the particular ore treated, the alkali metal compound employed, and the presence of an oxidizing or non-oxidizing atmosphere.

The accompanying drawing, to which reference is made in the following description, is a flow sheet illustrating a preferred embodiment of the process as applied to a typical ore containing a compound or compounds of lead with one or more acidic radicals such as sulphide, sulphate, arsenide, arsenate, molybdate, vanadate or tungstate, and also containing insoluble gangue material such as silicates, and generally some other metal such as gold, silver, copper or zinc.

The lead ore to be treated is preferably first ground or comminuted to a suitable state of division, for example, about 40 mesh or finer, and mixed with the alkaline compound in an amount preferably slightly in excess over that required to combine with the acidic radical or radicals present in the ore. The ore and the alkaline compound, such as ordinary commercial soda ash, are preferably thoroughly mixed, as by grinding the materials together in a ball mill or other grinding apparatus. The ground mixture is then introduced into a reaction chamber, and heated until the reaction begins, a temperature of about 400° or less ordinarily being sufficient for this purpose. The reaction is exothermic and, when carried out in an oxidizing atmosphere, the heat of the reaction is generally sufficient to keep the entire mass at a glowing temperature, between 400° and 880° C. After the reaction has begun, the temperature should be maintained between these limits, and preferably below 800° C., until the reaction is completed. In some cases it may be necessary to apply some additional heat after the reaction has commenced, particularly after the reaction is nearly completed, but care should be exercised not to heat the mass to a sufficient temperature to cause fusion thereof during the progress of the reaction. However, if desired, the mass may be fused by heating to a higher temperature after the reaction is completed. The mass is preferably agitated during the roasting operation, as for example, by rotating the reaction chamber during the time the reaction is in progress, or in any other suitable manner. If an oxidizing atmosphere is desired, air or other oxidizing gas may be introduced into the reaction chamber in such manner as to provide intimate contact thereof with the reacting materials.

The time required for this roasting or heating operation varies considerably, depending upon the particular ore being treated, the temperature used, the rate of supply of oxygen to the furnace, the rate of mixing, and the type of furnace employed. In most cases, however, when carried out under proper conditions on a commercial scale, it is found that the reaction may be completed in from three to ten minutes. The conversion of the sulphide or other lead compound to the oxide or carbonate is thus seen to be much more rapid than in other metallurgical processes heretofore employed.

In some cases, it may be advantageous to carry out the roasting or heating operation in a non-oxidizing atmosphere, by substantially excluding air from the reaction chamber or restricting the admission of air thereto, or by introducing an inert or non-oxidizing gas, in order to recover the acidic radical in a non-oxidized form. Thus, it is possible, for example, to recover sulphur in the form of sodium sulphide (as indicated by Equation 2 above), which is of greater value as a by-product than sodium sulphate.

This step of the process, which is indicated at A in the accompanying flow sheet, serves to convert the lead to one or more compounds, such as lead oxide or lead carbonate, difficultly soluble in water but soluble in an organic acid such as acetic acid. The gangue material remains substantially in insoluble form. Compounds of copper or zinc, if present, are converted to oxides or carbonates, while any gold or silver present either as free metal or in combined form is present in free metallic state in the mixture following this heating step. The acidic radical or radicals originally combined with the lead, as well as any such acidic radical or radicals originally combined with other metals such as gold, silver, copper, or zinc, are converted to water-soluble alkali metal salt or salts, such as sulphate or arsenate, as more fully described above.

The alkali metal compounds formed in the above described reaction may be removed from the lead compound and from any insoluble gangue material by washing or digesting the reaction mass with water at any suitable temperature, preferably hot, and separating the solution thus obtained in any suitable manner, for example, by filtration, decantation, dewatering, or centrifuging. This leaching operation is indicated at B. If desired, the alkali salts may be recovered from this solution by well-known methods, for example, by crystallization, and the salts thus removed, such as sodium sulphate, sodium sulphide, sodium arsenate, or other compounds of the alkali metal with the acidic element present in the original ore or derived therefrom, may form valuable by-products of the process.

Other methods of treatment may in some cases be used for converting the original lead compound to a compound soluble in a suitable organic acid. For example, the process may be applied to the recovery of lead from the mixture of lead sulphate and lead peroxide contained in used or "junk" storage batteries. In this instance, the mixture of lead sulphate and lead peroxide is preferably first separated from the metallic lead present in the battery plates, as by breaking up said mixture and separating the same from the lead plates by screening or in any other suitable manner. Said mixture may be treated in the same manner as above described, by heating with an alkali metal carbonate or oxide. However, a somewhat modified procedure may, if desired, be used in this case, since the lead peroxide may be converted to lead oxide by heating alone, while the lead sulphate may be converted to lead carbonate or hydroxide by treatment with an aqueous solution of an alkaline compound of an alkali metal, such as an alkali metal carbonate or hydroxide, without the necessity of heating during this latter treatment.

For example, the mixture of lead sulphate and lead peroxide, preferably in ground or otherwise divided condition, may first be heated to a temperature of 290° C. or above to convert the lead peroxide to lead oxide, using any suitable type of furnace, and the remaining mixture may then be treated with an aqueous solution containing an equivalent amount of sodium or potassium carbonate or hydroxide, at about atmospheric temperature or above, to convert the lead sulphate to lead carbonate or lead hydroxide. The soluble alkali metal sulphate formed in this reaction may be removed in solution in water, as by filtering and washing, and the mixture of lead oxide and lead hydroxide or lead carbonate thus obtained is then substantially completely soluble in acetic acid or other suitable organic acid. If desired, the order of treatment may be reversed, by first treating the mixture with an aqueous solution containing sufficient alkali metal carbonate or hydroxide to convert the lead sulphate to lead carbonate or lead hydroxide, removing the alkali metal sulphate thus formed, in solution in water, as by filtering and washing, and then drying and heating the remaining solids to convert the lead peroxide to lead oxide.

The undissolved residue from step B or from either of the alternative procedures above described contains the lead oxide or carbonate, the gangue material, copper or zinc (in the form of oxide or carbonate) if present, and any gold or silver as free metal, substantially free from the acidic radical or radicals.

This undissolved residue is then leached with acetic acid or other equivalent organic acid, as indicated at C, to dissolve the lead compound or compounds, and the resulting solution containing, for example, lead acetate may be separated from any insoluble material in any well-known manner, as by filtration or other known separating means, preferably followed by washing.

The acetic acid may be used in the form of an aqueous solution of any suitable concentration, for example, from about 5% to about 40%, good results being generally obtained by the use of a 20% solution. Also, I may use aqueous solutions of other organic acids which form water-soluble lead salts, such as propionic, trichloracetic, or butyric acid. I find that the best results are obtained by the use of a weakly ionized organic acid, and acetic acid is found to give somewhat better results than any other acid which has been used. The dissolution of the lead compound may be carried out at atmospheric temperature, although a temperature above atmospheric, for example, from about 80° to 100° C., is generally preferable in order to make the dissolution proceed more rapidly.

The solution of lead acetate or the like, produced as above described, is then treated by adding an acid containing an acidic radical which will combine with lead, in such solution, to form an amorphous or finely divided precipitate. It is known that lead sulphate and certain other lead salts precipitated from solution in strongly ionized acids such as nitric acid are crystalline and are not suitable for use as pigments, but I have found that lead sulphate or other difficultly soluble lead compound, when precipitated from an aqueous solution of lead acetate or the like, by addition of the corresponding acid, is amorphous or in extremely finely divided condition and is especially suitable for use as a paint pigment. This not only eliminates the necessity of grinding or further reducing the precipitated compound, but produces a material of much finer particle size than has previously been obtainable by methods involving grinding or comminution. Furthermore, the products so formed are of exceptionally high purity.

For example, if sulphuric acid is added to a lead acetate solution such as above described, as indicated at D, lead sulphate is precipitated in amorphous condition and may be used as a paint pigment. The precipitated lead sulphate may be separated in any suitable manner from the solution in which it is formed, as per example by filtering, as indicated at E. The finely divided amorphous lead sulphate obtained in this manner may be converted to amorphous lead carbonate by suspending said lead sulphate in an aqueous solution of an alkali metal carbonate such as sodium carbonate or potassium carbonate, preferably by adding said aqueous solution to an aqueous suspension or paste of the lead sulphate. The amorphous lead carbonate thus formed is ordinarily somewhat basic, and it will be understood that the proportion of lead hydroxide in the product may be increased by the use of a solution containing some sodium or potassium hydroxide, along with the sodium or potassium carbonate. The expression "lead carbonate" as used herein will be understood to include both neutral lead carbonate and basic lead carbonate, and references to the addition of an "alkali metal carbonate" solution for the formation of such lead carbonate will be understood to include such a solution either with or without some alkali metal hydroxide.

Basic lead carbonate, known commercially as white lead, may be formed by first adding, at a temperature of about 70° F., an aqueous solution of sodium or potassium hydroxide, preferably containing about 2% or less of said hydroxide, to an aqueous paste or suspension of lead sulphate precipitated as above described, in such proportions that upon subsequent addition of sodium or potassium carbonate the product formed will contain the desired proportion of lead hydroxide, the proportion of water being such as to form a fluid suspension containing lead sulphate, and hydroxide and unconverted lead sulphate, and then adding to said suspension an aqueous solution containing sodium or potassium carbonate in small excess over the amount theoretically required to form the desired basic lead carbonate compound, which has approximately the composition represented by the formula $2PbCO_3.Pb(OH)_2$. Instead of separately adding the hydroxide and carbonate solutions, the desired basic lead compound may be formed by adding one solution containing the desired proportions of hydroxide and carbonate. The above described step of converting the precipitated lead sulphate to basic lead carbonate is indicated at F, and the resulting basic lead carbonate, after the conversion is completed, may be separated from the solution by filtering or otherwise, as indicated at G.

The basic lead carbonate thus formed is in extremely finely divided condition and is characterized by an unusually high uniformity of particle size and shape. By reason of these properties the product so formed has been found by actual test to have an exceptionally high color strength, hiding power, covering power, bulking property, oil absorption, and resistance to weathering, and is therefore advantageously adapted for use as a pigment.

I may also form a basic lead sulphate, having approximately the composition $2PbSO_4.Pb(OH)_2$, by treating the precipitated lead sulphate with aqueous sodium hydroxide solution in substantially the same manner as in the first step described above in the formation of basic lead carbonate, except that the proportion of sodium hydroxide is somewhat greater, so as to form a product of substantially the above composition. The basic lead sulphate so formed also has advantageous properties for use as a pigment, such as those above mentioned in connection with the basic lead carbonate, and furthermore, has a higher resistance to corrosive weathering conditions than basic lead carbonate.

As another example, the precipitated lead sulphate may be converted to lead peroxide, $PbO_2$, by suitable oxidizing treatment, for example, by adding aqueous sodium hypochlorite solution to an aqueous suspension of lead sulphate, or by adding aqueous sodium hydroxide solution to an aqueous suspension of lead sulphate, and then introducing chlorine gas. The lead peroxide thus formed is amorphous and extremely finely divided, and of exceptional purity, and is advantageously adapted for use as a paint pigment or as an oxidizing agent.

Lead sulphate precipitated as above described may also be converted into other useful compounds; for example, a neutral lead arsenate may be prepared by bringing said precipitated lead sulphate into contact with an aqueous solution of sodium or potassium arsenate, which will react with the suspended lead sulphate to form finely divided neutral lead arsenate, useful as an insecticide.

Many other examples may be given of the formation of difficultly soluble lead compounds in finely divided form, such as the production of lead chromate by addition of chromic acid to the aqueous solution of lead acetate or the like, the lead chromate thus precipitated being also in extremely finely divided condition appropriate for paint pigment use.

Other examples may also be mentioned, such as the precipitation of lead arsenate by adding arsenic acid to the aqueous lead acetate solution, or the precipitation of lead chloride by addition of hydrochloric acid to such solution or by introducing hydrogen chloride, the lead arsenate being also obtained in finely divided condition and being suitable for use as an insecticide or the like, and the lead chloride being likewise obtained in finely divided condition.

Lead chloride precipitated as above described may also be converted to lead carbonate or basic lead carbonate by treatment in substantially the same manner as described above for the formation of such compounds from lead sulphate.

In any of the above described processes for precipitating finely divided lead compounds by addition of an acid to an aqueous solution of lead acetate or the like, the acetic acid or other organic acid is regenerated, and may be used for the dissolution of lead compound from a further quantity of treated ore. It will be understood that the above described methods of precipitating finely divided lead salts from lead acetate solutions may also be carried out in substantially the same manner with solutions of soluble lead salts of other organic acids such as those above mentioned.

In case the aqueous solution of lead acetate or the like, obtained by leaching the treated ore as above described, contains appreciable amounts of compounds of other metals such as copper or zinc, it is advantageous to carry out the precipitation of the finely divided lead compound from such solution by means of an acid whose lead compounds are materially less soluble in water than the compounds of such acid with said other metals. For example, in the case of sulphuric acid, the lead sulphate is much less soluble than zinc sulphate or copper sulphate, so that the precipitated lead sulphate, after washing, is substantially free from contamination by compounds of zinc or copper. With some acids, such as chromic acid or arsenic acid, which may also be capable of forming sparingly soluble compounds with other metals present, I have found that the precipitation of compounds of such other metals may be avoided by adding the acid in an amount somewhat less than sufficient to combine with all the lead present, since under these conditions the acid will react substantially wholly to effect precipitation of the lead compound, without causing any appreciable precipitation of compounds of other metals, due to the materially lower solubility of the lead compound.

The process of this invention may also be advantageously applied to a lead ore in which the lead is partly or wholly in the form of a compound soluble in an organic acid, such as lead oxide or lead carbonate. In case a substantial proportion of the lead is present in such form, it may simply be dissolved out with an aqueous solution of acetic acid or the like, and the desired finely divided lead compound may be precipitated from the resulting solution. In general, however, I prefer to first subject the ore to reaction with an alkaline compound in the manner above described, in order to convert all the lead present to a form in which it is soluble in an organic acid and thus obtain a high degree of recovery of lead from the ore, and to also recover the acidic elements of the ore as by-products.

Furthermore, the process may advantageously be applied to the treatment of mixed ores of lead and other metals such as copper, bismuth, zinc, or nickel, in combination with various acidic radicals such as above mentioned, or to ores containing silver, gold, or other noble metals either in the free state or in combination with an acidic radical. Compounds of copper, bismuth, zinc, or any one of a number of other metals will be converted by the above described treatment with sodium carbonate at elevated temperature into the oxides, carbonates, or other compounds soluble in an organic acid of the type described, and will therefore be dissolved along with the lead, and the resulting solution may be treated in any known manner to separate the salts of such other metals from the lead acetate or the like, as by fractional crystallization. In some cases, where the other metal present will not interfere with the precipitation of the desired finely divided lead compound, such other metal may be allowed to remain in the solution until the lead compound has been precipitated and separated, and may then be separately recovered therefrom. This may be done, for example, if copper acetate is present and if the lead is to be precipitated as the sulphate.

Any gold, silver, or other noble metal present in the ore in the metallic state will remain in that state, and will be left with the gangue materials after the extraction with acetic acid or the like, while any such noble metal present in combination with an acidic radical, such as gold telluride or silver sulphide, will be converted to the metallic state by the treatment with alkali metal carbonate or oxide at elevated temperature, and will also remain with the gangue. Such noble metals may be recovered from the gangue, after the extraction of the lead with the organic acid solution, by methods known to the art, such as by dissolving in cyanide solution or by amalgamation.

The following is given as an illustrative example of the process:

The ore used was a typical galena ore, containing about 60% lead principally in the form of lead sulphide, and also containing 50 ounces of silver per ton, principally as silver sulphide, and 0.28 ounce of gold per ton, partly free and partly combined, and some other precious metals, associated with a siliceous gangue. Twenty pounds of this ore, ground to approximately 60 mesh or finer, was mixed with about 6.7 pounds of sodium carbonate (ordinary grade of soda ash), thus providing a slight excess over the amount of sodium radical required to combine with the acidic radicals in the roast, in order to insure substantially complete conversion of the lead sulphide to lead oxide and of the precious metals to the free state. The ground ore and soda ash were thoroughly mixed in a ball mill, and the mixture was then introduced into a reaction chamber providing free access of air to the mass, and was heated until reaction began, at a temperature of about 400° C., agitation being maintained throughout the reaction period, by rotation of the reaction chamber, so as to provide rapid and uniform reaction. The reaction was exothermic, the heat of the reaction serving to keep the entire mass at a glowing temperature between about 400° and 800° C. without further external heating. The mixture was not fused, but remained in the form of a granular mass during the entire reaction.

The reaction was completed in about five minutes, after which the entire mass was placed in about three gallons of water and the whole was heated to just below boiling temperature for a period sufficient to dissolve the sodium sulphate and other sodium salts formed in the reaction.

Upon filtering and washing, the residue was found to consist of lead oxide (PbO), metallic silver, gold and small amounts of other precious metals and oxides, and the insoluble gangue material, chiefly silica. The residue was essentially free from sulphur or sulphur compounds.

The residue, weighing approximately 19 pounds and containing practically all the original lead as lead oxide, was treated with about 4 gallons of acetic acid solution of a concentration of 20% at a temperature of about 100° C., and the lead oxide was substantially completely dissolved as normal lead acetate. The resulting lead acetate solution was separated from the undissolved residue including the gangue materials and the gold, silver and other precious metals, by filtration, with a little washing, leaving very little mechanical loss of lead acetate remaining in the gangue.

The recovered solution contained substantially all the lead originally present, as lead acetate. Approximately ⅜ gallon of commercial sulphuric acid (98% $H_2SO_4$) was then added while agitating, at a temperature of approximately 60° C. The resulting precipitate of lead sulphate was separated by filtration, was washed with water, and was found to be in extremely finely divided condition and of extremely high purity suitable for use as a pigment without further reduction in size.

This finely divided lead sulphate was obtained within less than an hour after the mixture of ground ore (containing PbS) and sodium carbonate was placed in the reaction chamber to start the reaction. Similarly, lead sulphate can be produced in a correspondingly short time from ores containing lead arsenide, lead carbonate, and other compounds mentioned above.

As an illustrative example of the production of basic lead carbonate from a precipitated lead compound in accordance with this invention, 20 pounds of lead sulphate precipitated as above described were made into a paste with a small amount of water. A 2% solution of sodium hydroxide was then added in sufficient amount to provide 1⅔ pounds of NaOH. A substantially saturated solution containing about 4.85 pounds of commercial soda ash was then added, resulting in the formation and precipitation of basic lead carbonate in very finely divided condition. The precipitate was separated by filtration, and dried, and was found to consist of basic lead carbonate containing about 31% $Pb(OH)_2$.

In another case, similar amounts of materials were used, but the sodium hydroxide and sodium carbonate were simultaneously added, in aqueous solution, to the paste of precipitated lead sulphate. The proportion of sodium carbonate used in the above tests was about 2 to 3% in excess of the amount theoretically required, in addition to the sodium hydroxide, to combine with the lead in the lead sulphate, in order to insure complete conversion.

By adding a solution of sodium carbonate alone to the precipitated lead sulphate, using about 2 to 3% excess of the carbonate, a less basic lead carbonate may be precipitated, containing only about 9% $Pb(OH)_2$.

It will be apparent, therefore, that the process of this invention may be employed for the production of many different lead compounds, and that the products so obtained are characterized by an extremely fine state of division and uniform particle size and shape, and are suitable for use as pigments, insecticides, or other purposes requiring finely divided products, without further grinding. Furthermore, the products so obtained are of extremely high purity.

It will be noted from the above description that the mixture of the lead ore and alkali metal carbonate or oxide is kept at a temperature below the temperature of fusion thereof during the reaction for converting the original lead compound to a form soluble in acetic acid or equivalent organic acid, so that said mixture is maintained in the form of a granular mass during this reaction. This completely prevents the formation of metallic lead during the roasting operation, while I have found that, if the temperature is raised sufficiently to cause fusion of the mass during this reaction, some of the lead is generally reduced to the metallic state, and is thereby not only rendered insoluble in the organic acid used for dissolving the lead compound from the treated ore but is also caused to form alloys with other metals present, which is objectionable for the purpose of this invention. Furthermore, keeping below the fusion temperature substantially prevents reaction between any silica present and the added alkali metal compound, to form sodium silicate, which reaction would consume a portion of the added alkali metal compound, and increase the amount thereof which would have to be used to effect complete conversion of the lead. Also, the granular mass obtained from the above reaction is in a sufficiently divided state to permit leaching thereof with water and with the organic acid, either with no further grinding or with only a relatively light grinding to break up any loosely bound cakes which may have been formed. On the other hand, if the mass were caused to fuse, it would have to be completely re-ground or otherwise reduced to finely divided condition prior to leaching. It will be understood, however, that in some cases there may be a more or less complete fusion of some constituent or constituents present in the ore, resulting in a partial sintering thereof, without causing fusion or objectionable sintering of the mass as a whole.

While I have herein described certain preferred embodiments of this invention by way of illustration, it will be understood that the ingredients and steps in the process may be varied by those skilled in the art without departing from the spirit of this invention or exceeding the scope of the appended claims.

I claim:
1. The method of making finely divided lead carbonate from an ore containing a compound of lead with an acidic radical, associated with gangue material, which comprises: heating such an ore, in divided condition, with an alkali metal compound selected from the group consisting of alkali metal carbonates and oxides, at a temperature below the temperature of fusion of the mass, to convert the lead to a compound difficultly soluble in water but soluble in an organic acid capable of forming a water-soluble normal lead salt, and to convert the acidic radical into a water-soluble salt of said alkali metal; dissolving said water-soluble alkali metal salt in water; separating the resulting solution of said alkali metal salt from the undissolved material including the last-named lead salt and gangue material; then treating said undissolved material with an aqueous solution of such an organic acid in sufficient amount to combine with substantially all the lead present in said last-named lead compound and form said normal salt of lead with the acidic radical of said acid, and to produce an aqueous solution containing said normal lead salt; separating the last-named solution from undissolved gangue material; adding sulphuric acid to said last-named solution, to precipitate lead sulphate in finely divided condition by reaction of said sulphuric acid with said normal lead salt; separating the precipitated lead sulphate from the remaining solution; and bringing said precipitated lead sulphate into contact with an aqueous solution containing an alkali metal carbonate to cause formation of lead carbonate in finely divided condition.

2. The method of making finely divided basic lead carbonate from an ore containing a compound of lead with an acidic radical, associated with gangue material, which comprises: heating such an ore, in divided condition, with an alkali metal compound selected from the group consisting of alkali metal carbonates and oxides, at a temperature below the temperature of fusion of the mass, to convert the lead to a compound difficultly soluble in water but soluble in an organic acid capable of forming a water-soluble normal lead salt, and to convert said acidic radical to a water-soluble salt of said alkali metal; dissolving said water-soluble alkali metal salt in water; separating the resulting solution of said alkali metal salt from the undissolved material including the last-named lead compound and gangue material; then treating said undissolved material with an aqueous solution of such an organic acid in sufficient amount to combine with substantially all the lead present in said last-named lead compound and form said normal salt of lead with the acidic radical of said acid, and to produce an aqueous solution containing said normal lead salt; separating the last-named solution from undissolved gangue material; adding sulphuric acid to said last-named solution, to precipitate lead sulphate in finely divided condition by reaction of said sulphuric acid with said normal lead salt; separating said precipitated lead sulphate from the remaining solution; and treating said lead sulphate, in the presence of water, with sodium hydroxide and sodium carbonate, to cause formation of basic lead carbonate in finely divided condition.

ORRIN F. MARVIN.